Sept. 23, 1969  E. LINDNER ET AL  3,468,482

SHUTOFF NOZZLE FOR INJECTION MOLDING MACHINES

Filed April 27, 1967  2 Sheets-Sheet 1

INVENTORS:
EDMUND LINDNER
ARNULF KNOLL

BY: *Marzall, Johnston, Cook & Root*
ATT'YS

Sept. 23, 1969　　　E. LINDNER ET AL　　　3,468,482
SHUTOFF NOZZLE FOR INJECTION MOLDING MACHINES
Filed April 27, 1967　　　　　　　　　　　　　2 Sheets-Sheet 2

INVENTORS:
EDMUND LINDNER
ARNULF KNOLL
BY Marzall, Johnston, Cook & Root
ATT'YS

United States Patent Office 3,468,482
Patented Sept. 23, 1969

3,468,482
SHUTOFF NOZZLE FOR INJECTION
MOLDING MACHINES
Edmund Lindner, Ludwigshafen (Rhine), and Arnulf
Knoll, Lindenberg uber Enustadt, Germany, assignors to Badische Anilin- & Soda-Fabrik Aktiengesellschaft, Ludwigshafen (Rhine), Germany
Filed Apr. 27, 1967, Ser. No. 634,163
Claims priority, application Germany, May 4, 1966,
B 66,213
Int. Cl. B05b *1/32, 1/30;* F16k *15/00*
U.S. Cl. 239—453          4 Claims

ABSTRACT OF THE DISCLOSURE

A shutoff nozzle for injection molding machines having a nozzle-closing element arranged radially to the longitudinal axis of the nozzle and opening automatically as the pressure of the injection molding material increases; also the spring which loads the nozzle closure element.

---

This invention relates to a needle shutoff nozzle for injection molding machines having a shutoff needle arranged radially to the longitudinal axis of the nozzle and having a closing spring which is so arranged that it takes up very little space.

Injection molding machines for processing thermoplastics are often provided with nozzles which are closed by a spring-loaded closure needle. These nozzles open automatically when the pressure in the loading chamber of the injection molding machine reaches a certain magnitude owing to the movement of the plunger or screw.

Nozzles having a closure needle lying in the axis of the injection cylinder have a relatively small external diameter and therefore permit deep penetration into the stationary platen on the sprue side of the injection mold. They are however fairly expensive to make because lateral openings have to be present in the body of the nozzle to transfer the force of the external spring to the internal closure needle, the stream of injection molding material flowing past the said openings.

Shutoff nozzles in which the shutoff needle is located in a radial opening in the body of the nozzle and closes the axial nozzle channel with their front end are cheaper to make. In this arrangement, too, the spring-loaded nozzle needle is automatically opened by the increasing pressure of the injection molding material.

However, it is a great disadvantage of the conventional designs of such shutoff nozzles that the spring loading the shutoff needle occupies a relatively large space outside the body of the nozzle and therefore considerably disturbs the coaction of the nozzle with the stationary platen of the injection mold.

The object of this invention is to obviate this disadvantage and to design the closure spring in an advantageous manner to save space so that the shutoff nozzle can be used in cases where the tip of the nozzle penetrates deep into the stationary platen of the mold and the diameter of the appropriate recess in the mold has to be kept very small.

According to this invention the closure spring is constructed as a double hairpin spring. The two coils of this spring lie close against the two sides of the body of the nozzle.

Other features of the invention will be evident from the following detailed description given with reference to the accompanying drawings.

Figure 1:
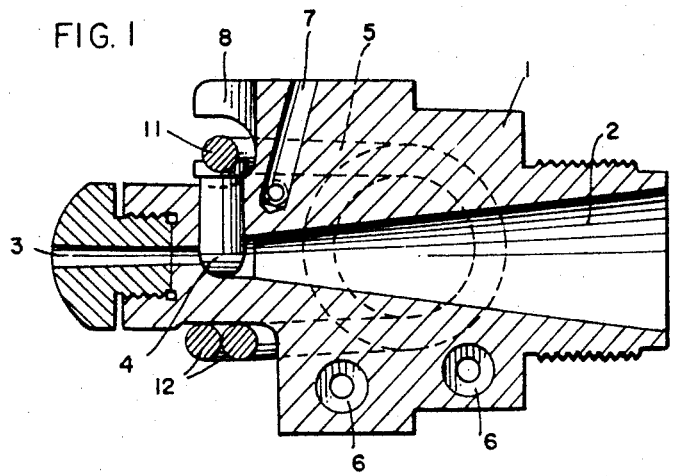
Figure 2:
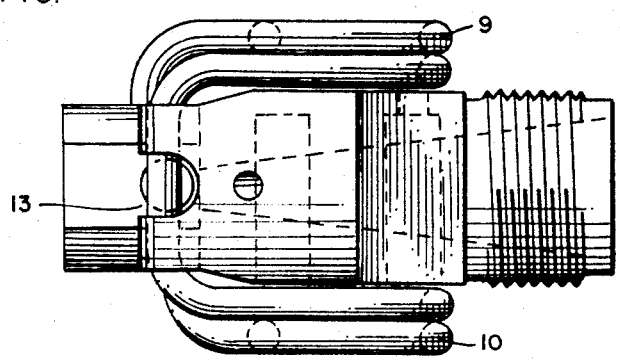
Figure 3:
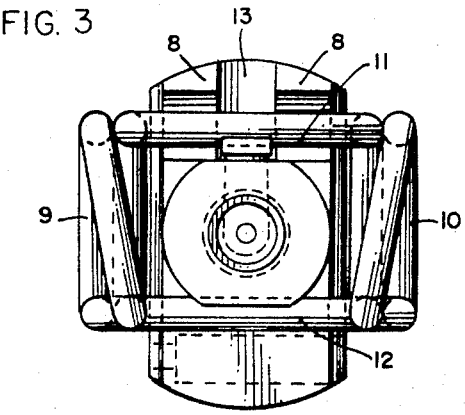
Figure 4:
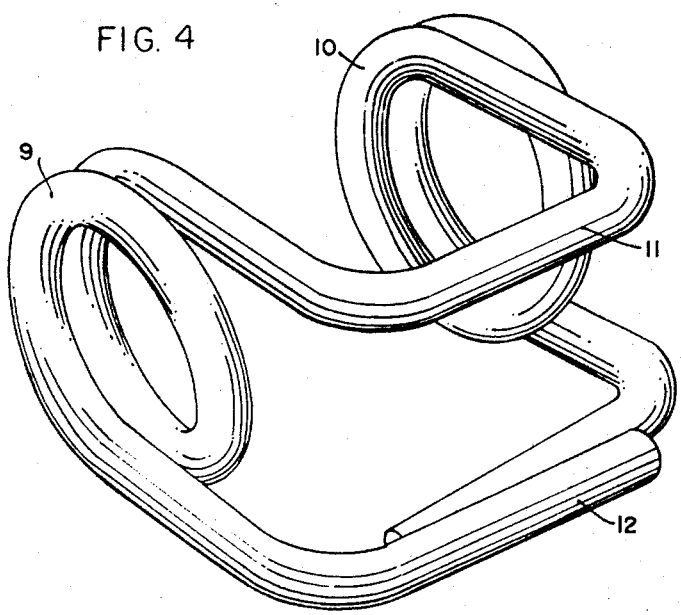

FIGURE 1 is a sectional elevation of a shutoff nozzle; FIGURE 2 is a plan view of the nozzle and FIGURE 3 is an elevation of the nozzle viewed from the orifice of the channel of the nozzle. FIGURE 4 is a perspective view of the spring which clearly shows its shape.

The body 1 of the nozzle has a conical channel 2 which is coaxially connected to the injection cylinder and to the nozzle orifice 3. Another opening is arranged radially to and preferably perpendicularly to the nozzle channel and contains the needle 4 for closing the nozzle. The closure needle 4 is forced into the closed position by a spring 5.

The spring 5 is a double hairpin spring which consists essentially of two spring coils 9 and 10, an upper connecting member 11 and a lower connecting member 12 formed by the two ends of the spring wire. The two spring coils 9 and 10 lie closely against the two sides of the body 1 so that they occupy only a small space. The upper connecting member 11 of the spring 5 presses on the head of the closure needle 4 in a saddle-shaped bearing, while the lower spring wire ends forming connecting member 12 rest against the body 1 of the nozzle.

The body 1 is provided with a lug 8 as a stop for the spring 5. The upper connecting member 11 of the closure spring rests against the lug 8 when the closure needle 4 is fully open. The stroke of the needle is thus limited and overextension of the closure spring is prevented. The needle 4 can be introduced through a hole 13 in the lug 8 into the opening in the body of the nozzle when the spring has been removed.

The provision of electrical heating elements 6 for heating the nozzle and of an opening 7 to receive a temperature sensor is not interfered with by the shape and positioning of the coils 9 and 10 and the connecting members 11 and 12 of the closure spring 5.

We claim:
1. In a closure nozzle for an injection molding machine having a spring-loaded closure needle arranged radially to the nozzle channel and opening automatically as a result of the pressure of the material being injection molded, the improvement of a double hairpin spring for closing the needle, said spring having two spring coils which lie close against the two sides of the body of the nozzle, an upper connecting member pressing against the head of the closure needle to spring-load the same and a lower connecting member formed from the ends of the spring wire.

2. A closure nozzle as claimed in claim 1 wherein a lug is provided on the body of the nozzle to serve as a stop to limit the opening stroke of the closure needle.

3. A closure nozzle as claimed in claim 2 wherein the lug is provided with a hole through which the closure needle can be introduced into the opening in the body of the nozzle.

4. A closure nozzle as claimed in claim 3 wherein the opening for the closure needle is perpendicular to the nozzle channel.

References Cited

UNITED STATES PATENTS

| 3,280,806 | 10/1966 | Iskenderian | 267—1 X |
| 3,354,507 | 11/1967 | Orrevad | 18—30 |

FOREIGN PATENTS

| 42,776 | 5/1966 | Germany. |
| 242,764 | 11/1925 | Great Britain. |

M. HENSON WOOD, Jr., Primary Examiner

M. Y. MAR, Assistant Examiner

U.S. Cl. X.R.

18—30; 137—537; 239—586; 251—145; 267—1